United States Patent [19]

Chesworth et al.

[11] Patent Number: 4,749,397
[45] Date of Patent: Jun. 7, 1988

[54] METHOD OF COATING GLASS

[75] Inventors: Peter Chesworth, Burscough Town; Martin Lowe, Wigan, both of England

[73] Assignee: Pilington Brothers P.L.C., St. Helens, England

[21] Appl. No.: 8,377

[22] Filed: Jan. 29, 1987

[30] Foreign Application Priority Data

Jan. 29, 1986 [GB] United Kingdom ............... 8602128
Dec. 18, 1986 [GB] United Kingdom ............... 8630254

[51] Int. Cl.$^4$ ...................... C03C 17/34; C03B 23/02
[52] U.S. Cl. ...................... 65/60.2; 65/60.4; 65/60.5; 65/62; 65/104
[58] Field of Search ............ 65/60.4, 62, 104, 62, 65/60.2, 60.5, 104

[56] References Cited

U.S. PATENT DOCUMENTS

| Re. 25,711 | 1/1965 | Gaiser. | |
| 3,743,491 | 7/1973 | Poole et al. | 65/60.2 |
| 3,762,902 | 10/1973 | Wagner et al. | 65/62 |
| 3,793,167 | 2/1974 | Glaser | 65/60.2 |
| 4,329,379 | 5/1982 | Terneu | 65/60.2 |
| 4,497,700 | 2/1985 | Groth et al. | |
| 4,547,400 | 10/1985 | Middleton et al. | 65/60.2 |

FOREIGN PATENT DOCUMENTS

| 0035906 | 9/1981 | European Pat. Off. . |
| 0229921 | 7/1987 | European Pat. Off. . |
| 400714 | 4/1965 | Switzerland . |
| 1123574 | 8/1968 | United Kingdom . |
| 1336825 | 11/1973 | United Kingdom . |
| 2129831 | 5/1984 | United Kingdom . |
| 2135697 | 9/1984 | United Kingdom . |

OTHER PUBLICATIONS

Chemical Abstracts, vol. 93, No. 24, Dec. 1980, p. 252, Abstract 224625r.

Primary Examiner—Arthur Kellogg
Attorney, Agent, or Firm—Burns, Doane, Swecker & Mathis

[57] ABSTRACT

Bent and/or toughened silver coated glass having high light transmission is produced by depositing layers of additional metal over, or both under and over, the silver layer. When the additional metal is used over the silver layer, it it selected from aluminium, titanium, zinc and tantalum. When the additional metal is used both under and over the silver, it is selected from aluminium, titanium, zinc, tantalum and zirconium. The additional metal is used in an amount such that the light transmission of the coated glass increases on bending and/or toughening. The bent and/or toughened coated glass is useful for architectural glazing and as vehicle windows.

21 Claims, No Drawings

METHOD OF COATING GLASS

BACKGROUND OF THE INVENTION

1. Field of the Invention

The invention relates to glass substrates coated with light transmitting silver coatings, and to the production and processing of such silver coated glass substrates, useful in both architectural glazings and in vehicle windows.

2. Description of the Prior Art

It is known that transparent glass substrates with a thin silver coating, typically 5 nm to 30 nm thick, may be produced with a high light transmission and low emissivity i.e. which reflect a high proportion of infrared radiation incident upon them but allow visible radiation to pass through. The use of such coatings on window glass (or plastics used in glazings) leads to a reduction in heat loss and results in valuable savings in heating costs. For optimum light transmission, the silver layers are sandwiched between thin anti-reflection layers of metal oxide. Such low emissivity coatings including a thin layer of silver sandwiched between layers of metal oxide are described, for example, in European patent specification EP No. 0 035 906 and UK patent specification GB No. 2 129 831.

According to European patent specification EP No. 0 035 906, a thin layer of material selected from the group consisting of titanium, zirconium, silicon, indium, carbon, cobalt and nickel is deposited between the silver and the overlying metal oxide layer to improve the long term durability of the coating. This additional thin layer has a thickness in the range 0.3 nm to 10 nm, preferably 1 nm to 5 nm. In each case, the thickness is selected to be sufficient to improve the durability of the coating, but not so great as to cause an unacceptable reduction in the light transmission of the coated product. The specification teaches that the coated substrate should preferably have a light transmission of at least 60% although the specification does include some Examples of coated substrates which have a light transmission of less than 60%; most of these are comparative Examples, but two, Example 56 (light transmission 58%) and Example 58 (light transmission 56%) are designated Examples of the invention. Their low light transmissions are due, in part, to the absence of an anti-reflection metal oxide between the silver layer and the glass (Example 56) or over the silver layer (Example 58).

In all the Examples, the coatings are on plastics substrates. UK patent specification GB No. 2 129 831 is concerned with problems which arose when attempts were made to apply the metal oxide layer overlying the silver layer by a reactive sputtering process in the presence of oxygen. Under these conditions, the low emissivity properties of the silver layer were lost, and the light transmission of the product was substantially lower than expected. These problems were overcome, according to patent specification GB No. 2 129 831, by sputtering an additional metal or metals other than silver in an amount equivalent to a layer 0.5 nm to 10 nm thick onto the silver layer.

U.K. patent specification GB No. 2 129 831 recommends the use of additional metal in an amount just sufficient to achieve the required low emissivity while obtaining a coating of the maximum possible light transmission. Unfortunately, coated glass produced according to UK patent specification GB No. 2 129 831 is not stable to heating in air, and the coating loses its properties of low emissivity and high light transmission when the coated glass is subjected to a thermal cycle required for bending or toughening the glass. Thus, in order to obtain a toughened or bent glass substrate bearing a silver coating and having high light transmission, it has been necessary to bend and/or toughen the glass substrate first, and then to apply the silver coating to the bent and/or toughened glass.

BRIEF SUMMARY OF THE INVENTION

The above difficulty has been overcome, in accordance with the present invention, by depositing an additional metal, in an amount greater than required in accordance with the teaching of UK patent specification GB No. 2129831, over the silver layer. The presence of the additional metal reduces the light transmission of the coating below the optimum value. However, it is found, surprisingly, that when the coated glass substrate is heated in a bending and/or toughening cycle not only does the coated glass maintain its light transmission, the light transmission of the coating actually increases. The emissivity of the coated glass may simultaneously be reduced.

According to the present invention there is provided a process for the production of a bent and/or toughened silver coated glass substrate which comprises depositing a coating comprising a silver layer 5 nm to 30 nm thick, a layer of a predetermined amount of an additional metal selected from aluminium, titanium, zinc and tantalum over the silver layer, and an anti-reflection metal oxide layer over said layer of additional metal on a glass substrate and subjecting the glass substrate to a bending and/or toughening cycle in which it is heated to a temperature above the softening point of the glass, wherein the coated glass develops an increased light transmission during the bending and/or toughening cycle.

The invention also provides a process for the production of a bent and/or toughened silver coated glass substrate which comprises depositing a coating comprising a layer of a first predetermined amount of additional metal selected from aluminium, titanium, zinc, tantalum and zirconium over the substrate, a silver layer 5 nm to 30 nm thick over said layer of additional metal, a further layer of a further predetermined amount of additional metal selected from aluminium, titanium, zinc, tantalum and zirconium over the silver layer, and an anti-reflection metal oxide layer over said further layer of additional metal, and subjecting the coated glass substrate to a bending and/or toughening cycle in which it is heated to a temperature above the softening point of the glass, wherein the coated glass develops an increased light transmission during the bending and/or toughening cycle.

DETAILED DESCRIPTION OF THE INVENTION

The additional metal is preferably deposited substantially free from oxygen i.e. by sputtering in the absence of oxygen, but may be deposited in partially oxidised form (e.g. as a metal oxide which contains a lower proportion of oxygen than the stoichiometric form of the oxide the metal forms in its highest valency state) provided the metal retains sufficient capacity to react with available oxygen and protect the silver during the bending and/or toughening cycle.

The expression "softening point" used herein refers to the temperature at which the glass is just beginning to soften. In the present context, it is equivalent, for practical purposes, to the anealing point (defined in Standard C598-72 of the American Society for Testing Materials). In practice, as is well known in the art, glass is generally heated significantly above the softening point for bending and/or toughening.

In a typical bending process, a coated soda lime silica glass substrate is heated in air at a temperature in the range 570° C. to 620° C., allowed to sag in a mold of desired curvature, and the bent glass annealed.

In a typical toughening process, a coated soda lime silica glass substrate is heated in air at a temperature in the range 600° C. to 670° C., optionally bent, and rapidly cooled to toughen it. The glass may be cooled by blowing air onto the glass surface.

Samples of coated glass in which the additional metal had been deposited only over the silver, processed in accordance with the invention, were analysed by Auger electron spectroscopy. In Auger analysis, a beam of electrons (the primary beam) is directed onto the surface to be analysed, and the elements present in the surface are characterised and quantified by examining the energy spectrum of secondary electrons emitted from the surface. The surface atomic layers are then removed by argon ion etching to expose sub-surface atoms which are then characterised and quantified as described above. The etching and analysis steps are repeated to build up a profile of the composition of the surface layers to the required depth, for example the thickness of the coating. The analysis showed that, when the additional metal used was aluminium or zinc, after bending and/or toughening, the additional metal is found both above and below the silver layer. It is believed that the aluminium and zinc migrate through the silver layer during the bending and/or toughening cycle.

Arising from this discovery, it was found that, instead of depositing all the required additional metal over the silver layer, part of the additional metal may be deposited under the silver layer. Moreover, when the additional metal is divided, with part deposited over the silver and part deposited under the silver, zirconium is also effective as the additional metal.

It is believed that the additional metal deposited over and/or under the silver layer becomes oxidised during the bending and/or toughening cycle taking up available oxygen; the silver layer is thus protected from the effect of oxygen so that the desired low emissivity (high infra red reflection) of the product is maintained, with an increase in the light transmission of the product resulting from oxidation of the additional metal to metal oxide.

The predetermined amount of additional metal deposited in the/ or each layer of additional metal is regulated so that the coated glass develops an increased light transmission during the bending and/or toughening cycle.

The amount of additional metal required depends upon the toughening and/or bending cycle to which the coated glass is to be subjected, and the degree of oxidation of the additional metal. In general, the higher the temperature and the longer the glass is hot, the greater the amount of the additional metal required; the lower the temperature, and the shorter the time the glass is hot, the smaller the amount of additional metal required. The time required to heat a glass pane to the temperature required for bending or toughening will generally be longer the thicker the glass. Thus, as a general rule, the thicker the glass, the greater amount of additional metal required.

Thus the amount of additional metal used may be regulated in accordance with the temperature to which the glass is heated and the duration of the heating cycle employed in the bending and/or toughening cycle to maximise the light transmission of the bent and/or toughened product.

The amount of additional metal used is preferably selected so that the coated glass has the maximum possible light transmission after bending and/or toughening; this will generally involve the use of a total amount of additional metal such that the light transmission of the coated glass increases by at least 10% of its original value on bending and/or toughening.

The coated glass substrate usually has a light transmission of less than 70%, generally in the range 30% to 70%, before bending and/or toughening, the exact light transmission depending on the particular additional metal used and the bending and/or toughening cycle to be used. On bending and/or toughening, the coated substrates will usually develop an increased light transmission of at least 70%; the preferred products have a light transmission of at least 75%, more preferably at least 80%, with an emissivity of less than 0.2, after bending and/or toughening.

The light transmission figures quoted are for coatings on clear glass substrates. It will be appreciated that the present invention is also applicable to the coating of body coloured glass (which has an inherently lower light transmission than clear glass) which is to be subsequently bent and/or toughened. Generally, whether the glass substrate is clear or coloured, the total amount of the additional metal used is selected so that the light transmission of the bent and/or toughened coated glass is at least 80%, and preferably at least 90%, of the light transmission of the uncoated substrate.

The amounts of additional metal deposited over and optionally under the silver layer have been referred in terms of their effect on the light transmission of the product because the physical thicknesses are, as described hereafter, difficult to determine. However, from the determinations which have been made, it is believed that it will usually be necessary to use the additional metal in an amount equivalent to a single metal layer at least 4 nm thick (or two layers having a total thickness of at least 4 nm) in order to provide adequate protection for the silver layer during bending and toughening. It is further believed that the amount of additional metal used should preferably be less than required to form a single layer 15 nm thick (being equivalent to two layers having a total thickness of less than 15 nm) in order to ensure sufficient oxidation of the metal during bending or toughening to provide adequate light transmission in the bent and/or toughened product. The more highly oxidised the additional metal present, the greater the amount required to take up available oxygen and protect the silver layer. When all the additional metal is applied over the silver layer, it is prefered to use, as the additional metal, aluminium or zinc. When the additional metal is applied partly over the silver and partly under the silver, it is preferred to use, as the additional metal, aluminium, zinc or titanium.

In a particularly preferred embodiment of the invention, the additional metal is aluminium in an amount equivalent to a layer 5 nm to 10 nm thick. It is especially preferred, for reasons of convenience, to deposit all the aluminium over the silver layer.

The silver layer in the coating preferably has a thickness of 5 nm to 20 nm.

The anti-reflection layer of metal oxide over the additional metal overlying the silver is preferably a layer of tin oxide, titanium oxide, indium oxide (optionally doped with tin oxide), bismuth oxide, zinc oxide or zirconium oxide. If desired, a mixture of two or more metal oxides may be used. The total thickness of any oxide layers overlying the silver layer after bending and/or toughening of the glass, that is, the thickness of any anti-reflection metal oxide layers overlying the silver layer plus the thickness of the oxidised additional metal over the silver, will usually be in the range from 10 nm to 80 nm, and preferably from 20 nm to 60 nm.

If desired, an anti-reflection layer may be deposited onto the glass before the silver layer or any layer of additional metal under the silver to increase the light transmission of the product. When such an anti-reflection layer is deposited, it may conveniently be a metal oxide layer, for example any of the metal oxides described above for use as an anti-reflection layer over the silver layer. This underlayer may serve, not only as an anti-reflection layer, but also as a primer layer to improve the adhesion of the silver layer to the glass. It will usually have a thickness in the range 10 nm to 80 nm, especially 20 nm to 60 nm, although, in any particular case, the thickness used will depend on the metal oxide chosen and the colour and other properties desired in the product. If desired, a succession of two or more anti-reflection layers of similar total thickness, i.e. usually 10 nm to 80 nm especially 20 nm to 60 nm, may be used under the silver layer.

The coating may be applied to the glass substrate by sputtering the required metal layers, including the silver layer, in the appropriate sequence in an inert atmosphere and reactively sputtering an anti-reflection layer of metal oxide over the additional metal overlying the silver. The sputtering operations may be magnetically enhanced.

According to a further aspect of the invention there is provided a coated glass substrate with a coating comprising a silver layer 5 nm to 30 nm thick, a layer of additional metal selected from aluminium, titanium, zinc and tantalum over the silver layer, and an anti-reflection metal oxide layer over said additional metal which coated glass substrate, when subjected to a bending and/or toughening cycle in which the glass is heated in air to a temperature above the softening temperature of the glass, develops an increased light transmission.

The invention further provides a coated glass substrate with a coating comprising a layer of additional metal selected from aluminium, titanium, zinc, tantalum and zirconium, a silver layer 5 nm to 30 nm thick over the layer of additional metal, a further layer of additional metal selected from aluminium, titanium, zinc, tantalum and zirconium over the silver layer, and an anti-reflection metal oxide layer over said further layer of additional metal which coated glass substrate when subjected to a bending and/or toughening cycle in which the glass is heated in air to a temperature above the softening temperature of the glass, develops an increased light transmission.

The present invention also provides, as new products, bent and/or toughened silver-coated glasses which have a light transmission of at least 80% of that of the glass substrate. When aluminium is used as the additional metal (whether applied over the silver or both over and under the silver), it is found to be present in the bent and/or toughened product in oxidised layers over and under the silver. When titanium, tantalum and zirconium are used, and are applied both over and under the silver layer, they are found to be present in the bent and/or toughed product in oxidised layers over and under the silver. Titanium and tantalum are also effective when applied only over the silver layer; in this case, they are found to be present in the bent and/or toughened product in oxidised layers over the silver layer. When zinc is used as the additional metal (whether applied over the silver or both over and under the silver), oxidised zinc is found to be present in the bent and/or toughened product distributed through the layers of the coating.

Thus, according to a further aspect of the present invention, there is provided a bent and/or toughened silver coated glass substrate having a light transmission of at least 80% of that of the uncoated glass the coating comprising an anti-reflection metal oxide layer, an oxidised layer of metal selected from aluminium, titanium, tantalum and zirconium over the anti-reflection layer, a silver layer 5 nm to 30 nm thick over said oxidised metal layer, a further oxidised layer of metal selected from aluminium, titanium, tantalum and zirconium over said silver layer, and an overlying anti-reflection metal oxide layer, the said two layers of oxidised metal having a combined total thickness in the range 8 nm to 30 nm. Preferably, each of the said two oxidised layers of metal has a thickness in the range 4 nm to 15 nm.

According to a still further aspect of the present invention, there is provided a bent and/or toughened silver-coated glass substrate having a light transmission of at least 80% of that of the uncoated glass, the coating comprising an anti-reflection metal oxide layer, a silver layer 5 nm to 30 nm thick over said anti-reflection layer, and an oxidised layer of titanium or tantalum over said silver layer, and an overlying anti-reflection metal oxide layer, the said layer of oxidised metal having a thickness in the range 8 nm to 30 nm.

According to a still further aspect of the present invention, there is provided a bent and/or toughened silver-coated glass substrate having a light transmission of at least 80% of that of the uncoated glass, the coating comprising an anti-reflection metal oxide layer, a silver layer 5 nm to 30 nm thick over said anti-reflection layer, and an overlying anti-reflection metal layer, with oxidised zinc distributed through all the layers of the coating. The oxidised zinc is preferably present in an amount equivalent to a layer of zinc 4 nm to 15 nm thick.

The bent and/or toughened glasses of the invention preferably have a light transmission of at least 70%.

The present invention enables bent and/or toughened silver coated glass substrates, with a high light transmission and a low emissivity (high infra red reflectivity) to be prepared by a process in which the silver coating is applied to flat annealed glass which is subsequently bent or toughened. This has two important practical advantages. First, the glass may be coated in stock sizes which are subsequently cut down and bent or toughened as required. Second, the coating is applied to the glass while it is flat, so avoiding the problems of forming uniform coatings on a curved glass substrate.

In the present specification and claims, the values quoted for light transmission are for transmission of light from a C.I.E. Illuminant C Source. The values of emissivity quoted are those obtained by applying the formula $$\text{Emissivity, } E = \frac{\int_0^\infty e_\lambda B(\lambda,T)d\lambda}{\int_0^\infty B(\lambda,T)d\lambda}$$

where $e_\lambda$ = spectral emittance and $B(\lambda,T)$ = black body spectral energy distribution at 300° K. For both light transmission and emissivity, the measurements were made with the radiation source on the coated side of the glass.

It is well known in the art that very thin layers of metal and metal oxide, particularly layers less than about 5 nm thick, may not be continuous, and it will be understood that the expression 'layer' is used herein to refer to both continuous and non-continous layers. Moreover, analysis of coatings comprising a plurality of thin layers of metal and/or metal oxide on a glass substrate generally indicates a substantial overlap or merging of adjacent layers so that there is no clear boundary between them; this overlap or merging is particularly marked when the layers are deposited by a high energy process such as magnetically enhanced sputtering. The layer thicknesses referred to in the specification and claims are the equivalent thickness of the continuous layers that would be formed by the material present assuming no overlap with adjacent layers.

To calculate the amounts of additional metal deposited in the practice of the present invention, the bent and/or toughened products have been analysed by Auger electron spectroscopy and the thickness of the oxidised layers of additional metal determined from the results of the analysis. First, the atomic % of each element detected in the Auger analysis is plotted against etch time to give an Auger depth profile. Then the area under the curve (or curves in the case in which layers of additional metal are present both under and over the silver) for additional metal is equated to the area of a rectangle (or rectangles) whose height corresponds to the atomic % of additional metal present in the additional metal oxide in which the oxidation state of the additional metal is equal to that observed in the Auger analysis. The thickness of the layer or layers of additional metal oxide is then calculated from the width of the rectangle(s).

The thickness of the layers of additional metal equivalent to the thickness of the layers of additional metal oxide determined in this way is then calculated from the known bulk densities of the additional metal and particular oxide of the additional metal found to be present. However, on the basis of experience, the additional metal oxide is assumed, for the purpose of the calculation, to have a bulk density of 80% of its known bulk density.

As noted earlier, it is known that certain additional metals, deposited over the silver layer, migrate through the silver layer on bending and/or toughening.

In cases in which all the additional metal has been deposited over the silver, the thickness of the original layer of additional metal deposited is determined by calculating the thickness of the single layer that would be formed by the total additional metal found to be present in the final product. In cases in which the additional metal is deposited partly under the silver layer and partly over the silver layer, the thickness of the layers of additional metal originally present are similarly calculated from the results of the analysis, assuming no net migration of the additional metal through the silver on toughening.

For most of the additional metals used, the results calculated are reasonably consistent with predictions of layer thickness based on the sputtering time and conditions used in the deposition of the layers of additional metal, although deviations of up to 25% between the calculated thickness and the predicted thickness are not uncommon. Except in the case of zinc, the calculated thicknesses are believed to be more reliable than the predicted thicknesses. In the case of zinc, the calculated thicknesses are about half the values of the predicted thicknesses; the zinc is found, in the Auger analysis, to be "smeared out" throughout the coating (but with a maximum concentration immediately above the coating). It is believed that, with the "smearing out", the calculation of the zinc concentration may not be very reliable and the predicted values are to be preferred. They have therefore been given, in brackets, next to the calculated values.

The invention is illustrated but not limited by the following Examples. Unless otherwise indicated, the layer thicknesses quoted in the Examples for the additional metal oxide and additional metal are calculated as indicated above from Auger electron spectroscopy analysis of bent and/or toughened coated products, in which the additional metal present has been substantially oxidised. The thicknesses of the silver layers and anti-reflection tin oxide are similarly calculated from the Auger analysis in conventional manner.

Examples 1–11

In each of these Examples, a pane of float glass was prepared for coating by washing and drying and loaded into a DC planar magnetron sputtering apparatus. For Examples 1 to 9 and 11, an Airco ILS 1600 apparatus was used; for example 10, a Nordiko NS 2500 apparatus was used.

A layer of tin oxide was reactively sputtered onto the glass surface from a tin cathode in the presence of an oxygen atmosphere at $5 \times 10^{-3}$ torr. In some cases a layer of a predetermined amount of additional metal was sputtered on to the tin oxide layer from a cathode of the additional metal in the presence of an argon atmosphere at $4 \times 10^{-3}$ torr. A layer of silver was then sputtered onto the tin oxide (or layer of additional metal if present) from a silver cathode in the presence of argon at $4 \times 10^{-3}$ torr and a layer of a predetermined amount of additional metal was sputtered onto the silver from a cathode of the additional metal in the presence of argon at $4 \times 10^{-3}$ torr. Finally, a layer of tin oxide was reactively sputtered over the additional metal from a tin cathode in the presence of an oxygen atmosphere $5 \times 10^{-3}$ torr; and the light transmission and emissivity of the product was measured. The thicknesses of the substrates used and the layers deposited (determined as explained above) are shown in Table 1, together with the light transmission and emissivity of the resulting products.

Each coated glass was suspended on tongs in a furnace maintained at 725° C. and withdrawn when it reached the desired temperature for toughening. Immediately after removal of each glass from the furnace, the glass was rapidly cooled and toughened by blowing air at ambient temperature on to the glass surface. The residence times in the furnace and approximate glass temperature achieved (measured using an infra red radiation thermometer) are shown in Table 2 together with the light transmission and emissivity of the coated products. The light transmission and emissivity of the products prior to heating are shown in brackets.

In each case, the amount of additional metal in the or each layer of additional metal is regulated so that not only is the light transmission maintained on toughening, but it actually increases, for example, by 28.4% of its original value in Example 1. The emissivity may also be improved, as in Example 1, where it is reduced from 0.17 to 0.10 on toughening, although in some cases, as in Example 8, there is an increase in emissivity on toughening. In each case, the light transmission before toughening is substantially lower than would be achieved following the teaching of GB No. 2,129,831 to produce a product of optimum light transmission.

The thicknesses of the oxidised layers of additional metal found in the toughened products, determined as described above, are shown below for the products made using aluminium, titanium, zirconium and tantalum as the additional metal.

| Example | Oxidised layer of additional metal below silver (nm) | Oxidised layer of additional metal above silver (nm) |
| --- | --- | --- |
| 1 | 3.6 | 5.3 |
| 2 | 11.3 | 7.4 |
| 3 | 6.9 | 15.6 |
| 4 | — | 14.5 |
| 5 | 12.5 | 14.0 |
| 6 | — | 15.0 |
| 9 | 5.1 | 5.4 |
| 10 | — | 17.3 |

In Examples 7, 8 and 11, made using zinc as the additional metal, oxidised zinc was found to be "smeared out" i.e. distributed through all the layers of the coating in the toughened product.

In a comparative Example, a 4 mm pane of float glass was coated with a coating comprising successive layers of tin oxide, silver, aluminium and tin oxide in accordance with the teaching of U.K. patent specificaton GB No. 2 129 831; the amount of aluminium used was, in accordance with the GB patent specification, just sufficient to achieve the required low emissivity while obtaining a coating of the maximum possible light transmission. The emissivity of the coating was 0.1 and the light transmission of the coated glass was 86.8%.

The coated glass was toughened as described above. The residence time in the furnace was 180 seconds and the glass achieved a temperature of approximately 650° C. After toughening, the coated glass was found to have an increased emissivity of 0.48 and a reduced light transmission of 79%.

EXAMPLE 12

A pane of float glass 6 mm thick was prepared for coating by washing and drying and loaded onto an Airco ILS 1600 D.C. planar magnetron sputtering apparatus.

Tin oxide was reactively sputtered onto the glass surface from a tin cathode in the presence of an oxygen atmosphere at $5 \times 10^{-3}$ torr to give a tin oxide layer 40 nm thick. A layer of silver 10 nm thick was then sputtered onto the tin oxide from a silver cathode in the presence of argon at $4 \times 10^{-3}$ torr and aluminium was sputtered onto the silver from an aluminium target in the presence of argon at $4 \times 10^{-3}$ torr to give an aluminium layer 6 nm thick. Finally a layer of tin oxide 40 nm thick was reactively sputtered over the aluminium from a tin cathode in the presence of an oxygen atmosphere at $5 \times 10^{-3}$ torr. The resulting product was found to have a light transmission of 50% and an emissivity of 0.26.

The glass was then suspended on tongs and lifted into a furnace set at 725° C. It was withdrawn after 240 seconds at which stage its temperature was measured as 650° C. The sample was immediately toughened by blowing air at ambient temperature onto the hot glass surface. The resulting toughened glass product had a light transmission of 78% and an emissivity of 0.11. In this Example, the layer thicknesses quoted were derived, by extrapolation, from the measured layer thicknesses of the same material deposited under similar sputtering conditions with appropriate allowance for different sputtering times.

EXAMPLE 13

A pane of grey body coloured float glass 6 mm thick (light transmission 40.8%) was coated with a tin oxide/silver/zinc/tin oxide coating of a composition similar to that described in Example 8. It was found to have a light transmission of 27.8% and an emissivity of 0.16. The coated glass was then toughened as described with reference to Examples 1 to 11; the residence time in the furnace was 245 seconds and the glass temperature achieved was approximately 650° C. After toughening, the coated glass was found to have a increased light transmission of 36%, being approximately 88% of the light transmission of the base glass, and an emissivity of 0.36. The increase in the light transmission of the glass on toughening was 29.5% of the transmission before toughening.

EXAMPLE 14

A pane of blue body coloured float glass 6 mm thick (light transmission 56%) was coated with a tin oxide/silver/zinc/tin oxide coating of a composition similar to that described in Example 8. It was found to have a light transmission of 28.3% and an emissivity of 0.13. The coated glass was then toughened as described with reference to Examples 1 to 11; the residence time in the furnace was 250 seconds and the glass temperature achieved was approximately 645° C. After toughening, the coated glass was found to have an increased light transmission of 43.8%, being approximately 78% of the light transmission of the base glass, and an emissivity of 0.25. The increase in the light transmission on toughening was 54.7% of the transmission before toughening. It will be noted that the zinc is apparently not quite so effective in protecting the coatings on body coloured glass in Examples 13 and 14 as the coating on clear float glass in Example 8. Thus, in Example 13 and 14, the light transmissions of the toughened products are 88% and 78% of the transmissions of the respective uncoated glasses, while in Example 8 the light tranmissions of the toughened product is approximately 93% of the light transmission of the uncoated glass. This may be because the glasses of Examples 13 and 14 are thicker than the glass of Example 8 and therefore require a longer residence time in the furnace for toughening, so that the amount of additional metal such as zinc required for optimum protection is greater than that used in Example 8.

EXAMPLE 15

A pane of clear float glass 2.3 mm thick was coated with successive layers of tin oxide, silver, aluminium and tin oxide as described in Example 12 using a Temescal in line D.C. magnetron architectural flat glass coater to give a coated pane having a light transmission of 60%. The coated pane was placed on a ring mould and transported through a graduated furnace where it was heated in successive stages to a maximum surface temperature of 600° C. The coated pane sagged in the furnace to the required curvature. It was withdrawn from the furnace and annealed. The bent, coated pane was found to have a light transmission of 84%.

The emissivity of the coated glass was not measured. However, the sheet resistance of the coating, which is generally related to emissivity, was measured before and after bending. Before bending it was 8 ohms per square and after bending it varied between 5 and 8 ohms per square, corresponding to an emissivity of less than 0.1. The maintenance of a low sheet resistance, which generally accompanies a low emissivity, is an important advantage of the invention, and enables the coatings on bent and/or toughened coated glasses of the invention to be used for heating e.g. in vehicle windows. When the coating is to be used for heating in a vehicle window, e.g. a windscreen, the coated glass will be usually laminated, with the coating inwards, after bending.

We claim:

1. A process for the production of a bent and/or toughened silver coated glass substrate which comprises depositing a coating comprising
   a silver layer 5 nm to 30 nm thick,
   a layer of a predetermined amount of an additional metal selected from aluminium, titanium, zinc and tantalum over the silver layer,
   and an anti-reflection metal oxide layer over said layer of additional metal
   on a glass substrate and subjecting the coated glass substrate to a bending and/or toughening cycle in which it is heated to a temperature above the softening point of the glass, wherein the coated glass develops an increased light transmission during the bending and/or toughening cycle.

2. A process according to claim 1 which comprises depositing the additional metal in an amount such that the coated glass develops an increased light transmission of at least 70% during the bending and/or toughening cycle.

3. A process according to claim 1 which comprises depositing the additional metal in an amount such that the coated glass develops an increased light transmission of at least 80% of the light transmission of the uncoated glass during the bending and/or toughening cycle.

4. A process according to claim 1 which comprises depositing the coating on a soda lime silica glass substrate and heating the coated glass substrate in air at a temperature in the range 570° C. to 620° C., allowing it to sag in a mold of desired curvature, and annealing the bent glass.

5. A process according to claim 1 which comprises depositing the coating on a soda lime silica glass sub-

TABLE 1

| Example | Glass thickness (nm) | Additional metal | Thickness of lower tin oxide layer (nm) | Thickness of additional metal layer under silver | Thickness of silver layer (nm) | Thickness of additional metal layer over silver (nm) | Thickness of upper tin oxide layer (nm) | Light transmission (%) | Emissivity |
|---|---|---|---|---|---|---|---|---|---|
| 1 | 3 | Al | 36 | — | 9.1 | 5.5 | 36 | 68.8 | 0.17 |
| 2 | 4 | Al | 35 | 7.0 | 10.5 | 4.6 | 36 | 49.0 | 0.11 |
| 3 | 10 | Al | 41 | — | 11.0 | 14.0 | 41 | 46.2 | 0.22 |
| 4 | 3 | Ti | 40 | — | 7.5 | 6.8 | 37 | 64.5 | 0.12 |
| 5 | 4 | Ti | 39 | 5.5 | 8.0 | 6.0 | 33 | 63.4 | 0.15 |
| 6 | 4 | Ti | 35 | — | 10.1 | 8.5 | 35 | 48.0 | 0.30 |
| 7 | 4 | Zn | 50 | — | 8.0 | 7.8 (7.9) | 54 | 38.0 | 0.10 |
| 8 | 4 | Zn | 39 | — | 9.4 | 7.1 (8.6) | 38 | 43.0 | 0.19 |
| 9 | 4 | Zr | 40 | 4.0 | 8.0 | 4.2 | 38 | 64.0 | 0.09 |
| 10 | 4 | Ta | 37 | — | 11.1 | 5.6 | 37 | 55.0 | 0.09 |
| 11 | 4 | Zn | 44 | * | 8.3 | * | 42 | 67.0 | 0.15 |

*Because the zinc distribution is "smeared out" through the coating (although showing a maximum concentration above the silver) it is not possible to distinguish, in the analysis, zinc deposited above the silver from zinc deposited below the silver. The total amount of zinc deposited above and below the silver was calculated as equivalent to a layer 4.6 nm thick; the zinc layer thicknesses predicted from the sputtering conditions and times were 3.4 nm below the silver and 4.8 nm above the silver.

TABLE 2

| Example | Residence time seconds | Glass Temperature (°C.) | Light transmission (%) | Light transmission of uncoated glass (%) | Emissivity |
|---|---|---|---|---|---|
| 1 | 75 | 600 | 88.3 (68.8) | 89.5 | 0.10 (0.17) |
| 2 | 180 | 650 | 78.0 (49.0) | 88.7 | 0.10 (0.11) |
| 3 | 320 | 670 | 75.9 (46.2) | 83.8 | 0.20 (0.22) |
| 4 | 160 | 640 | 73.8 (64.5) | 89.5 | 0.18 (0.13) |
| 5 | 180 | 650 | 78.4 (63.4) | 88.7 | 0.13 (0.15) |
| 6 | 180 | 650 | 70.0 (48.0) | 88.7 | 0.26 (0.30) |
| 7 | 180 | 650 | 77.0 (38.0) | 88.7 | 0.15 (0.10) |
| 8 | 180 | 650 | 82.4 (43.0) | 88.7 | 0.28 (0.19) |
| 9 | 180 | 650 | 73.0 (64.0) | 88.7 | 0.07 (0.09) |
| 10 | 180 | 650 | 78.0 (55.0) | 88.7 | 0.11 (0.09) |
| 11 | 180 | 650 | 84.3 (67.0) | 88.7 | 0.21 (0.15) | strate and heating the coated glass substrate in air at a temperature in the range 600° C. to 670° C., optionally bending the glass, and rapidly cooling the glass to toughen it.

6. A process according to claim 5 which comprises cooling the glass by blowing air onto the glass surface.

7. A process according to claim 1 which comprises regulating the amount of additional metal deposited in accordance with the temperature to which the glass is heated and the duration of the heating cycle employed in the bending and/or toughening cycle, to maximise the light transmission of the toughened and/or bent product.

8. A process according to claim 1 which comprises depositing said additional metal in an amount such that the light transmission of the coated glass increases by at least 10% of its original value on bending and/or toughening.

9. A process according to claim 1 which comprises depositing said additional metal in an amount sufficient to provide a single metal layer having a thickness in the range 4 nm to 15 nm.

10. A process according to claim 1 which comprises depositing aluminium or zinc as the additional metal.

11. A process according to claim 10 which comprises depositing aluminium in an amount equivalent to a layer 5 nm to 10 nm thick as the additional metal.

12. A process for the production of a bent and/or toughened silver coated glass substrate which comprises depositing a coating comprising
 a layer of a first predetermined amount of additional metal selected from aluminium, titanium, zinc, tantalum and zirconium over the substrate,
 a silver layer 5 nm to 30 nm thick over said layer of additional metal,
 a further layer of a further predetermined amount of additional metal selected from aluminium, titanium, zinc, tantalum and zirconium over the silver layer, and an anti-reflection metal oxide layer over said further layer of additional metal, and subjecting the coated glass substrate to a bending and/or toughening cycle in which it is heated to a temperature above the softening point of the glass, wherein the coated glass develops an increased light transmission during the bending and/or toughening cycle.

13. A process according to claim 12 which comprises depositing the additional metal in amounts such that the coated glass develops an increased light transmission of at least 70% during the bending and/or toughening cycle.

14. A process according to claim 12 which comprises depositing the additional metal in amounts such that the coated glass develops an increased light transmission of at least 80% of the light transmission of the uncoated glass during the bending and/or toughening cycle.

15. A process according to claim 12 which comprises depositing the coating on a soda lime silica glass substrate and heating the coated glass substrate in air at a temperature in the range 570° C. to 620° C., allowing it to sag in a mold of desired curvature, and annealing the bent glass.

16. A process according to claim 12 which comprises depositing the coating on a soda lime silica glass substrate and heating the coated glass substrate in air at a temperature in the range 600° C. to 670° C., optionally bending the glass, and rapidly cooling the glass to toughen it.

17. A process according to claim 16 which comprises cooling the glass by blowing air onto the glass surface.

18. A process according to claim 12 which comprises regulating the amounts of additional metal deposited in accordance with the temperature to which the glass is heated and the duration of the heating cycle employed in the bending and/or toughening cycle, to maximise the light transmission of the toughened and/or bent product.

19. A process according to claim 12 which comprises depositing said additional metal in an amount such that the light transmission of the coated glass increases by at least 10% of its original value on bending and/or toughening.

20. A process according to claim 12 which comprises depositing additional metal in a total amount sufficient to provide a single metal layer having a thickness in the range 4 nm to 15 nm.

21. A process according to claim 12 wherein the additional metal deposited in each layer of additional metal is aluminium, zinc or titanium.

* * * * *